United States Patent [19]

Maschberger et al.

[11] Patent Number: 5,332,762
[45] Date of Patent: Jul. 26, 1994

[54] BLOWING AGENT COMPOSITIONS AND COMPOSITIONS CURABLE TO GIVE ELASTOMERIC SILICONE FOAMS

[75] Inventors: Adolf Maschberger; Christian Freyer, both of Burghausen, Fed. Rep. of Germany

[73] Assignee: Wacker-Chemie GmbH, Munich, Fed. Rep. of Germany

[21] Appl. No.: 44,423

[22] Filed: Apr. 9, 1993

[30] Foreign Application Priority Data

Sep. 20, 1992 [DE] Fed. Rep. of Germany ....... 4235309

[51] Int. Cl.$^5$ .............................................. C08J 9/00
[52] U.S. Cl. ...................................... 521/91; 521/99; 521/154
[58] Field of Search ............................ 521/154, 99, 91

[56] References Cited

U.S. PATENT DOCUMENTS

| | | | |
|---|---|---|---|
| 2,857,343 | 10/1958 | Berridge | 521/154 |
| 4,189,545 | 2/1980 | Modic | 521/154 |
| 4,230,820 | 10/1980 | Maschberger et al. | 521/154 |
| 4,391,765 | 7/1983 | Lee et al. | 521/154 |
| 4,584,324 | 4/1986 | Bauman et al. | 521/154 |
| 4,613,630 | 9/1986 | Bauman et al. | 521/154 |
| 4,871,781 | 10/1989 | Weise | 521/154 |
| 5,019,295 | 5/1991 | Yoshida et al. | 521/154 |
| 5,061,736 | 10/1991 | Takahashi et al. | 521/154 |

FOREIGN PATENT DOCUMENTS

| | | |
|---|---|---|
| 0097915 | 3/1987 | European Pat. Off. |
| 0227233 | 11/1991 | European Pat. Off. |
| 2810921 | 9/1979 | France |
| 1130674 | 10/1968 | United Kingdom |

Primary Examiner—Morton Foelak
Attorney, Agent, or Firm—Martin Connaughton

[57] ABSTRACT

Blowing agent compositions (a) comprising aqueous emulsions containing organopolysiloxanes (1), emulsifiers (2), water (3) and thickeners (4) which may be used in the preparation of elastomeric silicone foams.

The blowing agent compositions are used in curable compositions to form elastomeric silicone foams which comprise the blowing agent compositions (a), diorganopolysiloxanes (b), crosslinking agents (c) and, if appropriate, crosslinking catalysts (d) and optionally fillers (e). Elastomeric silicone foams are prepared by mixing the blowing agent compositions (a), with curable organopolysiloxane compositions containing diorganopolysiloxanes (b), crosslinking agents (c) and, if appropriate, crosslinking catalysts (d) and optionally fillers (e) and also optionally additional substances and then the resultant mixture is cured at temperatures in the range of from 100° to 250° C. with simultaneous foaming to form the elastomeric silicone foams.

4 Claims, No Drawings

BLOWING AGENT COMPOSITIONS AND COMPOSITIONS CURABLE TO GIVE ELASTOMERIC SILICONE FOAMS

The invention relates to blowing agent compositions for the preparation of elastomeric silicone foams, processes for their preparation, compositions which are curable to give elastomeric silicone foams and processes for the preparation of the elastomeric silicone foams.

BACKGROUND OF THE INVENTION

Compositions which are curable to give elastomeric silicone foams are known in the art. In order to prepare foams of this type, curable compositions are treated with blowing agents which decompose when heated with the evolution of gas and thus effect foaming of the compositions during the curing reaction. In this regard, reference may be made to, for example, U.S. Pat. No. 2,857,343, U.S. Pat. No. 5,019,295 and GB-A 1,130,674.

In the curing reaction based on diorganopolysiloxanes containing Si-bonded vinyl groups and diorganopolysiloxanes containing Si-bonded hydrogen atoms, which reaction is catalyzed by platinum or platinum compounds, hydrogen is evolved as the blowing agent gas, which facilitates foaming, by the addition of water, organic alcohols or diorganopolysiloxanes containing Si-bonded hydroxyl groups. In this context, reference may be made to U.S. Pat. No. 4,189,545, U.S. Pat. No. 4,613,630, U.S. Pat. No. 4,871,781 and EP-B 227 233.

According to EP-B 97 915 and U.S. Pat. No. 4,391,765 an elastomeric foam is obtained by mechanical production of a foam from an aqueous, reactive silicone emulsion, adding surfactants and thickeners, in order to render the foam stable until the water is removed, and subsequent drying of the foam in an oven or in air, or subsequent exposure of the foam to an amount of microwave energy sufficient to remove water.

U.S. Pat. No. 4,584,324 discloses a pressurized composition comprising an aqueous emulsion which contains a crosslinking silicone polymer, emulsifier, water and optionally filler, crosslinking agent and thickener and which on drying at room temperature cures to give an elastomeric film and sufficient aerosol blowing agent, such as nitrogen, nitrogen oxide, isobutane, propane, dichlorodifluoromethane or trichlorofluoromethane, to convert the composition into a foam if it is reduced to atmospheric pressure at 25° C. The resultant foam yields an elastomeric foam after removal of water. The object of the invention was to provide water-based blowing agent compositions suitable for the preparation of elastomeric silicone foams. A further object was to provide compositions which are curable to give elastomeric silicone foams and which do not contain any toxic blowing agents or blowing agents liberating toxic decomposition products.

SUMMARY OF THE INVENTION

The foregoing objects and others which will become apparent from the following description are accomplished in accordance with this invention, generally speaking, by providing a blowing agent composition comprising (a) aqueous emulsions containing organopolysiloxanes (1), emulsifiers (2), water (3) and thickener (4) which may be used in preparing elastomeric silicone foams.

The invention also relates to a process for preparing blowing agent compositions (a), in which the aqueous emulsions containing organopolysiloxane (1), emulsifiers (2) and water (3) are mixed with thickeners (4).

Also the invention relates to compositions which are curable to elastomeric silicone comprising the blowing agent composition (a), diorganopolysiloxanes (b), crosslinking agents (c), if appropriate, crosslinking catalyst (d) and, if appropriate, fillers (e).

The invention also relates to a process for preparing elastomeric silicone foams, which comprises mixing the blowing agent composition (a), diorganopolysiloxanes (b), crosslinking agents (c), if appropriate, crosslinking catalyst (d) and, if appropriate, fillers (e) and also optionally additional substances together and thereafter curing the mixtures at a temperature of from 100° to 250° C. with simultaneous foaming to form the elastomeric silicone foams.

DESCRIPTION OF THE INVENTION

The blowing agent in the blowing agent compositions of this invention is water. Water evaporates under the action of heat or microwave energy during the curing reaction, expands and effects foaming of the compositions during the curing reaction. The gas evolved, water vapor, has the advantage of being nontoxic, nonflammable and odorless. In addition, an extremely fine dispersion of water is achieved by means of the blowing agent composition of this invention.

The blowing agent compositions (a) of this invention preferably have a viscosity of from $1 \times 10^5$ mPa.s to $1 \times 10^8$ mPa.s at 25° C., and more preferably from $5 \times 10^5$ mPa.s to $5 \times 10^7$ mPa.s at 25° C. The aqueous emulsions used in the preparation of the blowing agent compositions (a) of this invention can be any desired silicone emulsion.

The organopolysiloxanes (1) preferably used are those composed of units of the formula

$$R_x(R^1O)_y SiO_{\frac{4-x-y}{2}}, \quad (I)$$

in which R represents the same or different monovalent hydrocarbon radical having from 1 to 18 carbon atoms per molecule or a monovalent substituted hydrocarbon radical having 1 to 18 carbon atoms per radical, the $R^1$ represents the same or different and represents hydrogen or a monovalent hydrocarbon radical having from 1 to 8 carbon atoms per radical or a monovalent substituted hydrocarbon radical having 1 to 8 carbon atoms per radical, x is 0, 1, 2 or 3, y is 0, 1, 2 or 3 and the sum x+y is 0, 1, 2 or 3.

Organopolysiloxanes (1) which are liquid or solid at room temperature can be used.

The organopolysiloxanes (1) are preferably straight-chain organopolysiloxanes of the general formula

$$(R^1O)_t R_{3-t} SiO(SiR_2O)_r SiR_{3-t}(OR^1)_t \quad (II),$$

in which R and $R^1$ are the same as above, r is an integer having a value of from 50 to 2000, and t is 0 or 1, or cyclic organopolysiloxanes of the general formula

$$(R_2SiO)_s \quad (III),$$

in which R is the same as above and s is an integer having a value of from 3 to 100, or organopolysiloxane resins of the general formula

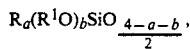

(IV)

in which R and $R^1$ are the same as above, a is 0, 1, 2 or 3, with an average of from 0.9 to 1.8, and b is 0, 1, 2 or 3, with an average of from 0.0 to 0.5.

Although not shown in formula (II), up to 10 mol % of the diorganopolysiloxane units can be replaced by other siloxane units, such as $R_3SiO_{\frac{1}{2}}$, $RSiO_{3/2}$ and $SiO_{4/2}$ units, in which R is the same as above; but usually only by siloxane units present with impurities which are more or less difficult to avoid.

The organopolysiloxane of formula (IV) is preferably an organopolysiloxane composed of $RSiO_{3/2}$ units or an organopolysiloxane composed of $RSiO_{3/2}$ and $R_2SiO$ units or an organopolysiloxane composed of $R_3SiO_{\frac{1}{2}}$ and $SiO_{4/2}$ units as well as, optionally, $R_2SiO$ units, where R is the same as above.

Examples of radicals represented by R are alkyl radicals, such as the methyl, ethyl, n-propyl, iso-propyl, n-butyl, iso-butyl, tert-butyl, n-pentyl, iso-pentyl, neopentyl and tert-pentyl radicals; hexyl radicals, such as the n-hexyl radical; heptyl radicals, such as the n-heptyl radical; octyl radicals, such as the n-octyl radical and isooctyl radicals, such as the 2,2,4-tri-methylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl, naphthyl and anthryl and phenanthryl radicals; alkaryl radicals, such as o-, m- and p-tolyl radicals, xylyl radicals and ethylphenyl radicals; and aralkyl radicals, such as the benzyl radical and the α- and the β-phenylethyl radicals.

Examples of substituted radicals represented by R are cyanoalkyl radicals, such as the β-cyanoethyl radical; and halogenated hydrocarbon radicals, for example halogenoalkyl radicals, such as the 3-chloro-n-propyl radical, the chloromethyl radical, the 3,3,3-trifluoro-n-propyl radical, the 2,2,2,2', 2', 2'-hexafluoroisopropyl radical, the heptafluoroisopropyl radical and the perfluorohexylethyl radical, halogenoaryl radicals, such as the o-, m- and p-chlorophenyl radicals, and the tetrafluoroethyloxypropyl radical.

Examples of radicals represented by $R^1$ are alkyl radicals, such as the methyl, ethyl, n-propyl, iso-propyl, n-butyl, iso-butyl and tert-butyl radicals.

Examples of substituted radicals represented by $R^1$ are the methoxyethyl radical and the ethoxyethyl radical.

Particularly preferred organopolysiloxanes (1) are straight-chain diorganopolysiloxanes of formula (II), and more preferably dimethylpolysiloxanes which have a viscosity of from 100 to 100,000 mPa.s at 25° C.

It is possible to use one type of organopolysiloxane (1) or a mixture of at least two different types of organopolysiloxanes (1).

In order to prepare the aqueous emulsions used in the preparation of the blowing agent compositions (a) of this invention, organopolysiloxanes (1) are emulsified with water and the addition of emulsifiers by the methods generally employed in silicone chemistry. Depending on its chemical nature, the emulsifier can be initially introduced either into the water phase or into the oil phase. The emulsifying step can be carried out in conventional mixing equipment suitable for the preparation of emulsions, such as high-speed stator-rotor stirrers according to Prof. P. Willems, such as are known under the registered trade name "Ultra-Turrax".

If solid organopolysiloxanes, and in particular those of formula (IV), are used for the preparation of the aqueous emulsions at room temperature, the emulsions are preferably prepared by the procedure described in U.S. Pat. No. 5,039,724. According to this procedure, organopolysiloxanes which are solid at room temperature are dissolved in low molecular weight organopolysiloxanes which are liquid at room temperature and these solutions are emulsified with water with the addition of emulsifiers and optionally additional substances. The dissolution of the organopolysiloxanes which are solid at room temperature in the organopolysiloxanes which are liquid at room temperature and the emulsifying step can be carried out in conventional mixing equipment suitable for the preparation of emulsions.

The emulsifiers (2) used to prepare the aqueous emulsions can be all the ionic and nonionic emulsifiers described heretofore, both individually and in the form of mixtures of different emulsifiers, with which it has been possible heretofore to prepare stable aqueous emulsions of organopolysiloxanes. Those emulsifiers which are described in U.S. Pat. No. 4,757,106 can also be used. Nonionic or anionic emulsifiers or mixtures of nonionic and anionic emulsifiers are preferably used. Nonionic emulsifiers preferably used are fatty alcohol polyglycol ethers or partially saponified polyvinyl alcohols. Fatty alcohol polyglycol ethers are available, for example, under the trade names "Arlypon SA4" or "Arlypon IT16" from Grünau and partially saponified polyvinyl alcohols are available, for example, under the trade name "Polyviol W25/140" from Wacker. The anionic emulsifiers used are alkyl sulfates, alkylbenzenesulfonates or alkylsulfonates.

The thickeners (4) used are preferably silicon dioxide which has a BET surface area of at least 50 $m^2/g$, preferably 50 to 400 $m^2/g$ and more preferably from 100 to 200 $m^2/g$, such as silicas prepared pyrogenically or precipitated silicas, which optionally are rendered completely or partially hydrophobic. Further examples of thickeners (4) are highly branched polyacrylic acids having a viscosity of from 5000 to 50,000 mPa.s at 25° C., for example those available under the trade name "Carbopol" from B.F. Goodrich Chemical, cellulose ethers having a viscosity of from 5000 to 50,000 mPa.s at 25° C., such as hydroxyethylcellulose and carboxymethylcellulose, for example those available under the trade name "Tylose" from Hoechst, and xanthans having a viscosity of from 5000 to 50,000 mPa.s at 25° C., for example those available under the trade name "Kelzan" from G. M. Langer.

The thickeners are preferably uniformly dispersed in the form of powder or granules by continuously stirring into the aqueous silicone emulsions comprising organopolysiloxanes (1), emulsifiers (2) and water (3). Mixing is generally carried out at a temperature of preferably from 5° to 40° C., and more preferably from 15° to 30° C., and under a pressure of preferably from 800 to 1200 hPa, and more preferably from 1000 to 1020 hPa. Mixing can be carried out in any desired vessels and in any desired sequence, preferably in mixing equipment without a high shear effect.

The blowing agent composition (a) preferably contains from 10 to 50% by weight, and more preferably from 15 to 40% by weight, of organopolysiloxanes (1), from 1 to 7% by weight, and more preferably from 2 to 6% by weight, of emulsifiers (2), from 20 to 80% by weight, and more preferably from 30 to 70% by weight, of water (3) and from 5 to 40% by weight, and more preferably from 10 to 20% by weight, of thickener (4).

The diorganopolysiloxanes (b) used in the compositions of this invention can be all the diorganopolysiloxanes which have been or could have been cured by means of free radical formation or by adding Si-bonded hydrogen onto Si-bonded alkenyl groups to form elastomeric foams.

The diorganopolysiloxanes (b) used in the compositions of this invention are preferably those of the general formula $$Z_n R^2{}_{3-n} SiO(R^2{}_2 SiO)_m SiR^2{}_{3-n} Z_n \qquad (V),$$

in which $R^2$ represents the same or different monovalent hydrocarbon radical having from 1 to 18 carbon atoms per radical or a monovalent substituted hydrocarbon radical having 1 to 18 carbon atoms per radical, Z is a hydroxyl group, n is 0 or 1, and m is an integer which has a value such that the average viscosity of the diorganopolysiloxanes is from $1 \times 10^6$ to $1 \times 10^9$ mPa.s at 25° C., and more preferably from $5 \times 10^6$ to $1 \times 10^8$ mPa.s at 25° C.

In addition to the diorganosiloxane units ($SiR^2{}_2O$), other siloxane units can be present within or along the siloxane chains of formula (V) shown above; although these are generally not shown in such formulas. Examples of such other siloxane units, which usually are present only as impurities, are those of the formulas $R^2SiO_{3/2}$, $R^2{}_3SiO_{\frac{1}{2}}$ and $SiO_{4/2}$, in which $R^2$ is the same as above. However, the amount of such other siloxane units other than the diorganosiloxane units is preferably at most 10 mol %, and in particular at most 1 mol %, based on the weight of diorganopolysiloxane (1).

Examples of radicals represented by $R^2$ are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl, naphthyl and anthryl and phenanthryl radicals; alkaryl radicals, such as o-, m- and p-tolyl radicals, xylyl radicals and ethylphenyl radicals; and aralkyl radicals, such as the benzyl radical and the α- and the β-phenylethyl radicals.

Examples of substituted radicals represented by $R^2$ are cyanoalkyl radicals, such as the β-cyanoethyl radical; and halogenated hydrocarbon radicals, for example halogenoalkyl radicals, such as the 3-chloro-n-propyl radical, the chloromethyl radical, the 3,3,3-trifluoro-n-propyl radical, the 2,2,2,2',2',2'-hexafluoroisopropyl radical, the heptafluoroisopropyl radical and the perfluorohexylethyl radical, halogenoaryl radicals, such as the o-, m- and p-chlorophenyl radicals.

It is preferred, because of their availability, that the majority of the radicals $R^2$ be methyl radicals. The other radicals which may optionally be present are preferably vinyl radicals. If the compositions are curable by free radical formation to form elastomers, the diorganopolysiloxanes (b) then contain preferably from 0 to 3% by weight, and more preferably from 0 to 0.5% by weight, of Si-bonded vinyl groups. The vinyl groups optionally present can be located at the end of the chain in the two terminal units $R^2{}_3SiO_{\frac{1}{2}}$ and/or within the chain in the $R^2{}_2SiO$ units of formula (V) above.

If n has a value of 0 and the compositions are curable by adding Si-bonded hydrogen onto Si-bonded alkenyl groups to give elastomers, at least two of the radicals $R^2$ per molecule in the diorganopolysiloxanes (b) of formula (V) above must be alkenyl radicals, preferably vinyl radicals. The alkenyl radicals, preferably vinyl radicals, are preferably located in the two terminal units $R^2{}_3SiO_{\frac{1}{2}}$ and/or within the chain in the $R^2{}_2SiO$ units of formula (V) above. If the alkenyl radicals are vinyl radicals, the diorganopolysiloxanes (b) preferably contain from 0.01 to 10% by weight, and more preferably from 0.03 to 5% by weight, of vinyl groups.

It is possible to use one type of diorganopolysiloxane (b) or it is possible to use a mixture of at least two different types of diorganopolysiloxanes (b).

Blowing agent compositions (a) are preferably used in the compositions of this invention in amounts of from 0.5 to 8% by weight, and more preferably from 1 to 5% by weight, based on the total weight of diorganopolysiloxanes (b) used.

If crosslinking of the compositions of this invention is effected by means of free radicals, the crosslinking agents (c) used are organic peroxides, which serve as the source of free radicals. Examples of organic peroxides are acyl peroxides, such as dibenzoyl peroxide, bis(4-chlorobenzoyl) peroxide, bis-(2,4-dichlorobenzoyl) peroxide and bis-(4-methylbenzoyl) peroxide; alkyl peroxides and aryl peroxides, such as di-tert-butyl peroxide, 2,5-bis-(tert-butylperoxy)-2,5-dimethylhexane, dicumyl peroxide and 1,3-bis-(tert-butylperoxy-isopropyl)-benzene; perketals, such as 1,1-bis-(tert-butylperoxy)-3,3,5-trimethylcyclohexane; and peresters, such as diacetyl peroxydicarbonate, tert-butyl perbenzoate, tert-butyl peroxyisopropyl carbonate, tert-butyl peroxyisononanoate, dicyclohexyl peroxydicarbonate and 2,5-dimethylhexane 2,5-diperbenzoate.

It is possible to use one type of organic peroxide (c) or it is possible to use a mixture of at least two different types of organic peroxides (c).

Peroxides are preferably used in the compositions of this invention in amounts of from 1 to 5% by weight, and more preferably from 2 to 3.5% by weight, based on the total weight of the diorganopolysiloxanes (b) used.

If crosslinking of the compositions of this invention is effected by adding Si-bonded hydrogen onto Si-bonded alkenyl groups in the presence of catalysts which promote this addition, the crosslinking agents (c) used are organopolysiloxanes containing at least two Si-bonded hydrogen atoms per molecule. Straight-chain, cyclic or branched organopolysiloxanes containing units of the general formula $$R^2{}_k H_l SiO_{\frac{4-k-l}{2}}, \qquad (VI)$$

in which $R^2$ is the same as above, k is 0, 1, 2 or 3, 1 is 0 or 1 and the sum of $k+1$ is 0, 1, 2 or 3, with the proviso that each molecule contains at least 2, and more preferably at least 3, Si-bonded hydrogen atoms per molecule are used. Organopolysiloxanes of the general formula $$H_gR^2{}_{3-g}SiO(R^2SiO)_o(R^2HSiO)_pSiR^2{}_{3-g}H_g \qquad (VII),$$

in which $R^2$ is the same as above, g is 0 or 1, o is an integer and p is 0 or an integer, the sum of $o+p$ being an integer which has a value such that the average viscosity of the organopolysiloxanes is preferably from 5 to 1000 mPa.s at 25° C., and more preferably from 10 to 500 mPa.s at 25° C., with the proviso that each molecule contains at least 2, and more preferably at least 3, Si-bonded hydrogen atoms per molecule are used. The organopolysiloxanes having at least 2 Si-bonded hydrogen atoms preferably contain from 0.1 to 1.7% by weight, and more preferably from 0.4 to 1.2% by weight, of Si-bonded hydrogen.

Organopolysiloxanes containing at least 2 Si-bonded hydrogen atoms per molecule are preferably used in amounts of from 0.5 to 10, and more preferably from 1 to 5, gram atom of Si-bonded hydrogen per mol of Si-bonded vinyl groups in the diorganopolysiloxanes (b).

The catalysts (d), which promote the addition of Si-bonded hydrogen onto Si-bonded alkenyl groups, which are used are preferably a metal from the group comprising the platinum metals or a compound or a complex thereof from the group comprising the platinum metals. Examples of such catalysts are platinum metal and finely divided platinum, which can be present on supports such as silicon dioxide, aluminum oxide or active charcoal, platinum compounds or complexes, such as platinum halides, for example $PtCl_4$, $H_2PtCl_6.6H_2O$ and $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6.6H_2O$ and cyclohexanone, platinum-vinylsiloxane complexes, such as platinum-1,3-divinyl-1,1,3,3-tetramethyldisiloxane complexes, which may be free from or contain detectable inorganically bonded halogen, bis(gamma-picoline)-platinum dichloride, trimethylenedipyridine-platinum dichloride, dicyclopentadiene-platinum dichloride, dimethyl sulfoxide ethyleneplatinum(II)dichloride, cyclooctadiene-platinum dichloride, norbornadiene-platinum dichloride, gamma-picoline-platinum dichloride, cyclopentadiene-platinum dichloride and also reaction products of platinum tetrachloride with olefin and primary amine or secondary amine or primary and secondary amines according to U.S. Pat. No. 4,292,434, such as the reaction product of platinum tetrachloride dissolved in 1-octene with sec-butylamine, or ammonium-platinum complexes according to EP-B 110 370.

The catalyst (d) is preferably used in amounts of from 0.5 to 200 ppm by weight (parts per million), preferably in amounts of from 2 to 50 ppm by weight, calculated as elemental platinum and based on the total weight of organopolysiloxanes used.

When the compositions are crosslinked by adding Si-bonded hydrogen onto Si-bonded alkenyl groups in the presence of catalysts which promote this addition, the compositions can contain inhibitors. Examples of inhibitors are 1,3-divinyl-1,1,3,3-tetramethyldisiloxane, benzotriazole, dialkylformamides, alkylthioureas, methyl ethyl ketoxime, organic or organosilicon compounds which have a boiling point of at least 25° C. at 1012 mbar (abs.) and at least one aliphatic triple bond according to U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyn-2,5-diol and 3,5-dimethyl-1-hexyn-3-ol, inhibitors according to U.S. Pat. No. 2,476,166, such as a mixture of diallyl maleate and vinyl acetate, and inhibitors according to U.S. Pat. No. 4,504,645, such as maleic acid monoesters.

The compositions of this invention can contain both reinforcing and non-reinforcing fillers (e).

Examples of reinforcing fillers (e), that is fillers having a BET surface area of at least 50 m$^2$/g are pyrogenically produced silicon dioxides, precipitated silicon dioxides, carbon black, such as furnace black and acetylene black, and silicon/aluminum mixed oxides having a large BET surface area; and fibrous fillers, such as asbestos, graphite fibers and synthetic fibers.

Examples of non-reinforcing fillers, that is fillers which have a BET surface area of up to 50 m$^2$/g are quartz, diatomaceous earth, calcium silicate, zirconium silicate, zeolites, montmorillonites, such as bentonites, metal oxide powders, such as aluminum, magnesium, titanium, iron, zinc, manganese or cerium oxides and mixed oxides thereof, barium sulfate, calcium carbonate, gypsum, silicon nitride, silicon carbide, boron nitride, glass powders and plastic powders and mixtures of Teflon, graphite and carbon black.

The fillers can be rendered hydrophobic, for example by treatment with organosilicon compounds, such as hexamethyldisilazane, organosilanes or organosiloxanes, or by etherification of hydroxyl groups to alkoxy groups. It is possible to use only one type of filler (e) or it is also possible to use a mixture of at least two types of fillers (e).

Fillers (e) are preferably used in the compositions of this invention in amounts of from 10 to 120% by weight, and more preferably from 25 to 80% by weight, based on the total weight of the diorganopolysiloxanes.

The compositions of this invention can also contain other additives which are generally used in preparing compositions which are crosslinkable to form elastomeric foams, such as plasticizers, for example diorganopolysiloxanes of the general formula $$(R^1O)_uR^2{}_{3-u}SiO(SiR^2{}_2O)_vSiR^2{}_{3-u}(OR^1)_u \qquad (VIII),$$

in which $R^1$ and $R^2$ are the same as above, u is 0 or 1 and v is an integer which has a value such that the average viscosity of the diorganopolysiloxanes is from 10 to 500 mPa.s at 25° C., inorganic or organic pigments, antioxidants, heat stabilizers, agents for improving the electrical properties, antihydrolysis additives, so-called reversion stabilizers and flame-retardant additives.

The individual constituents of the compositions of this invention can be mixed with one another in any desired manner, for example in stirrers, mixers, kneaders or roll mills.

The blowing agent compositions (a) are stored separately from the other constituents.

Moldings from the compositions of this invention can be prepared under atmospheric pressure by extrusion or calendering, for example with subsequent vulcanization in the form of a milled sheet, or under pressure by calendering, for example with subsequent vulcanization in an rotocure machine (continuous vulcanization under pressure between a steel drum and a steel belt), foam molding, such as transfer pressing or HTV injection molding, or production of a milled sheet with subsequent foam molding.

If crosslinking of the compositions of this invention is effected by organic peroxides, curing is carried out with simultaneous foaming, preferably at temperatures of from 120° to 250° C.

If crosslinking of the compositions of this invention is effected by organic peroxides and processing of the compositions of this invention is carried out at atmospheric pressure, the organic peroxides used are preferably dibenzoyl peroxide, bis-(4-chlorobenzoyl) peroxide, bis-(2,4-dichlorobenzoyl) peroxide or bis-(4-methylbenzoyl) peroxide and curing is carried out with simultaneous foaming, preferably at temperatures in the range of from 160° to 230° C.

If crosslinking of the compositions of this invention is effected by organic peroxides and processing of the compositions of this invention is carried out under pressure, the organic peroxides preferably used are tert-butyl perbenzoate, dicumyl peroxide, tert-butyl peroxyisopropyl carbonate or 2,5-bis-(tert-butylperoxy)-2,5-dimethylhexane and curing is carried out with simultaneous foaming, preferably at temperatures in the range of from 130° to 200° C.

If crosslinking of the compositions of this invention is effected by adding Si-bonded hydrogen onto Si-bonded alkenyl groups in the presence of catalysts which promote this addition, curing is carried out with simultaneous foaming at temperatures of preferably from 100° to 250° C. When processing is carried out under atmospheric pressure, curing is preferably carried out at from 100° to 230° C. and when processing is carried out under pressure curing is carried out at from 130° to 250° C.

The compositions of this invention can be used in the production of foamed round cords, foamed sealing profiles, foamed insulating tubes, foamed mats and cushions, foamed damping elements, foamed stoppers, foamed seals and foamed roller coatings.

In the following examples all parts and percentages are by weight, unless otherwise specified.

Preparation of blowing agent compositions A to M (A) About 16 parts of a hydrophilic, pyrogenic silica having a BET surface area of 150 m$^2$/g (commercially available under the trade name "HDK V15" from Wacker-Chemie) were stirred slowly into 100 parts of an oil-in-water emulsion which contained 35% by weight of a dimethylpolysiloxane end-blocked by trimethylsiloxy groups and having a viscosity of 350 mPa.s at 25° C., 60% by weight of water and 5% by weight of a fatty alcohol polyglycol ether (commercially available under the trade name "Arlypon IT 10" from Grünau) until a homogeneous paste was formed. A blowing agent composition (A) was obtained.

(B) About 18 parts of a hydrophilic, pyrogenically produced silica having a BET surface area of 150 m$^2$/g (commercially available under the trade name "HDK V15" from Wacker-Chemie) were stirred slowly into 100 parts of an oil-in-water emulsion, which contained 35% by weight of a dimethylpolysiloxane end-blocked by trimethylsiloxy groups and having a viscosity of 100,000 mPa.s at 25° C., 59% by weight of water, 3% by weight of a fatty alcohol polyglycol ether (commercially available under the trade name "Arlypon IT 10" from Grünau) and 3% by weight of sodium dodecylbenzenesulfonate, until a homogeneous paste was formed. A blowing agent composition (B) was obtained.

(C) About 16 parts of a hydrophilic, pyrogenically produced silica having a BET surface area of 150 m$^2$/g (commercially available under the trade name "HDK V15" from Wacker-Chemie) were stirred slowly into 100 parts of an oil-in-water emulsion, which contained 35% by weight of a dimethylpolysiloxane end-blocked by trimethylsiloxy groups and having a viscosity of 12,500 mPa.s at 25° C., 59% by weight of water, 3% by weight of alkyl sulfate (commercially available under the trade name "Genapol CRT 40" from Hoechst AG) and 3% by weight of sodium alkylsulfonate (commercially available under the trade name "Emulgator K30" from Interorgana), until a homogeneous paste was formed. A blowing agent composition (C) was obtained.

(D) About 12 parts of a hydrophilic, pyrogenically produced silica having a BET surface area of 150 m$^2$/g (commercially available under the trade name "HDK V15" from Wacker-Chemie) were stirred slowly into 100 parts of an oil-in-water emulsion, which contained 30% by weight of an organopolysiloxane composed of 20 mol % of methyl-(phenylethyl)-siloxy units and 80 mol % of methyl-dodecylsiloxy units and having a viscosity of 1000 mPa.s at 25° C., 65% by weight of water and 5% by weight of fatty alcohol polyglycol ether (commercially available under the trade name "Arlypon IT10" from Grünau), until a homogenous paste was formed. A blowing agent composition (D) was obtained.

(E) About 20 parts of a pyrogenically produced silica having a BET surface area of 200 m$^2$/g which has been rendered hydrophobic (commercially available under the trade name "HDK H20" from Wacker-Chemie) were stirred slowly into 100 parts of an oil-in-water emulsion described above under (A) until a homogeneous paste was formed. A blowing agent composition (E) was obtained.

(F) About 18 parts of a hydrophilic, pyrogenically produced silica having a BET surface area of 300 m$^2$/g (commercially available undr the trade name "HDK T30" from Wacker-Chemie) were stirred slowly into 100 parts of an oil-in-water emulsion described above under (A) until a homogeneous paste was formed. A blowing agent composition (F) was obtained.

(G) About 16 parts of a hydrophilic, pyrogenically produced silica having a BET surface area of 150 m$^2$/g (commercially available under the trade name "HDK V15" from Wacker-Chemie) were stirred slowly into 100 parts of an oil-in-water emulsion, which contained 35% by weight of a polymethylsilsesquioxane containing a total of 10 mol % of hydroxyl groups and ethoxy groups, 60% by weight of water and 5% by weight of a partially saponified polyvinyl alcohol (commercially available under the trade name "Polyviol W25/140" from Wacker-Chemie), until a homogeneous paste was formed. A blowing agent composition (G) was obtained.

(H) About 14 parts of a hydrophilic, pyrogenically produced silica having a BET surface area of 150 m$^2$/g (commercially available under the trade name "HDK V15" from Wacker-water emulsion, which contained 50% by weight of a silicone resin containing 25 mol % of polydimethylsiloxane units and 75 mol % of polymethylsilsesquioxane units containing a total of 10 mol % of hydroxyl groups and ethoxy groups, 45% by weight of water and 5% by weight of fatty alcohol polyglycol ether (commercially available under the trade name "Arlypon IT16" from Grünau), until a homogeneous paste was formed. A blowing agent composition (H) was obtained.

(K) About 18 parts of a hydrophilic, pyrogenic silica having a BET surface area of 150 m$^2$/g (commercially available under the trade name "HDK V15" from Wacker-Chemie) were stirred slowly into 100 parts of an oil-in-water emulsion, which contained 30% by weight of a dimethylpolysiloxane end-blocked by trimethylsiloxy groups and having a viscosity of 12,500 mPa.s at 25° C., 2% by weight of a silicone resin of the average composition [(Me$_3$SiO$_{\frac{1}{2}}$)$_{0.7}$(SiO$_{4/2}$)$_{1.0}$(OEt)$_{0.04}$(OH)$_{0.01}$]$_{30}$, 65% by weight of water and 3% by weight of a fatty alcohol polyglycol ether (commercially available under the trade name "Arlypon IT16" from Grünau), until a homogeneous paste was formed. A blowing agent composition (K) was obtained.

(L) About 35 parts of a hydrophilic, precipitated silica having a BET surface area of 170 m$^2$/g (commercially available under the trade name "Ultrasil VN3" from Degussa) were stirred slowly into 100 parts of an oil-in-water emulsion described above under (A) until a homogeneous paste was formed. A blowing agent composition (L) was obtained.

(M) About 30 parts of a precipitated silica having a BET surface area of 100 m$^2$/g which has been rendered hydrophobic (commercially available under the trade name "Sipernat D17" from Degussa) were stirred slowly into 100 parts of an oil-in-water emulsion described above under (A) until a homogeneous paste was formed. A blowing agent composition (M) was obtained.

EXAMPLE 1

About 1.5 parts of blowing agent composition (A) and 0.5 part of a paste composed of equal parts of bis-(2,4-dichlorobenzoyl) peroxide and a dimethylpolysiloxane end-blocked by trimethylsiloxy groups and having a viscosity of 350 mPa.s at 25° C. (commercially available under the trade name "Vernetzer E" from Wacker-Chemie) and 1.7 parts of a paste composed of equal parts of dibenzoyl peroxide and a dimethylpolysiloxane end-blocked by trimethylsiloxy groups and having a viscosity of 350 mPa.s at 25° C. (commercially available under the trade name "Vernetzer B" from Wacker-Chemie) were mixed, on a roller, into 100 parts of an HTV silicone rubber mixture which contained 67 parts of a dimethylpolysiloxane end-blocked by trimethylsiloxy groups and having a viscosity of 10$^7$ mPa.s at 25° C., 10 parts of a dimethylpolysiloxane end-blocked by trimethylsiloxy groups and having a viscosity of 35 mPa.s at 25° C. and 23 parts of a hydrophilic, pyrogenically produced silica with a BET surface area of 130 m$^2$/g (commercially available under the trade name "HDK S13" from Wacker-Chemie). The resulting mixture was then extruded to give foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord was obtained having a diameter of 13 mm and having circular pores, with a homogeneous pore size distribution and a foam density of 0.6.

EXAMPLE 2

About 2 parts of blowing agent composition (B), 0.5 part of the "Vernetzer E" described in Example 1 and 1.7 parts of the "Vernetzer B" described in Example 1 were mixed, on a roller, into 100 parts of an HTV silicone rubber mixture which contains 75 parts of a dimethylpolysiloxane end-blocked by trimethylsiloxy groups and having a viscosity of 10$^7$ mPa.s at 25° C. and 25 parts of hydrophilic, pyrogenically produced silica with a BET surface area of 150 m$^2$/g. The resulting mixture was then extruded to give foam profiles or foam tubes and vulcanized in a hot air duct. Using an extruder die size of 10 mm in diameter (round cord), a vulcanization time of 5 minutes at 180° C. and an output rate of about 1.5 m/min, a homogeneously foamed round cord having a diameter of 19 mm and a foam density of 0.4 was obtained.

EXAMPLE 3

About 2 parts of blowing agent composition (H), 0.5 part of the "Vernetzer E" described in Example 1 and 1.7 parts of the "Vernetzer B" described in Example 1 were mixed, on a roller, into a mixture containing 50 parts of the HTV silicone rubber mixture described in Example 1 and 50 parts of the HTV silicone rubber mixture described in Example 2. The resulting mixture was then extruded to give foam profiles or foam tubes and vulcanized in a hot air duct. Using an extruder die size of 15 mm in diameter (round cord), a vulcanization time of 5 minutes at 200° C. and an output rate of about 1.5 m/min, a homogeneously foamed round cord having a diameter of 24 mm and a foam density of 0.5 was obtained.

EXAMPLE 4

About 1.5 parts of blowing agent composition (L), and 2 parts of the "Vernetzer B" described in Example 1 were mixed, on a roller, into 100 parts of the HTV silicone rubber mixture described in Example 1. The resulting mixture was then extruded to give foam profiles or foam tubes and vulcanized in a hot air duct. Using an extruder die size of 10 mm in diameter (round cord), a vulcanization time of 5 minutes at 220° C. and an output rate of about 1.5 m/min, a homogeneously foamed round cord having a diameter of 13 mm and a foam density of 0.7 was obtained.

EXAMPLE 5

About 1.5 parts of blowing agent composition (C) and 2 parts of bis-(4-methylbenzoyl) peroxide (commercially available under the trade name "Interox PMBP" from Peroxid-Chemie) were mixed, on a roller, into 100 parts of the HTV silicone rubber mixture described in Example 1. The resulting mixture was then extruded to give foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord having a diameter of 14 mm and a foam density of 0.6 was obtained.

EXAMPLE 6

About 2 parts of blowing agent composition (D) were mixed, on a roller, into 100 parts of an HTV silicone rubber mixture which contained 49 parts of a dimethylpolysiloxane end-blocked by trimethylsiloxy groups, composed of dimethylsiloxane units and methylvinylsiloxane units, having a viscosity of $2 \times 10^7$ mPa.s at 25° C. and containing 0.04% by weight of Si-bonded vinyl groups, 19 parts of a dimethylpolysiloxane end-blocked by dimethylvinylsiloxy groups, composed of dimethylsiloxane units and methylvinylsiloxane units, having a viscosity of $2 \times 10^7$ mPa.s at 25° C. and containing 0.25% by weight of Si-bonded vinyl groups, 1.4 parts of a dimethylpolysiloxane end-blocked by dimethylvinylsiloxy groups, composed of dimethylsiloxane units and methylvinylsiloxane units, having a viscosity of $8 \times 10^6$ mPa.s at 25° C. and containing 4.5% by weight of Si-bonded vinyl groups, 3 parts of a copolymer composed of trimethylsiloxane units, dimethylsiloxane units and methylhydrogenosiloxane units, having a viscosity of 50 mPa.s at 25° C. and containing 0.5% by weight of Si-bonded hydrogen atoms, 27.5 parts of hydrophilic, pyrogenically produced silica with a BET surface area of 300 m²/g and 0.06 part of platinum-1,3-divinyl-1,1,3,3-tetramethyldisiloxane complex having a platinum content of 1% by weight, based on elemental platinum, and 0.04 part of ethynylcyclohexanol. The resulting mixture was then extruded to give foam profiles or foam tubes and vulcanized in a hot air duct. Using an extruder die size of 15 mm in diameter (round cord), a vulcanization time of 5 minutes at 200° C. and an output rate of about 1.5 m/min, a homogeneously foamed round cord having a diameter of 20 mm and a foam density of 0.7 was obtained.

EXAMPLE 7

About 2 parts of blowing agent composition (A), 0.5 part of the "Vernetzer E" described in Example 1 and 1.7 parts of the "Vernetzer B" described in Example 1 were mixed, on a roller, into 100 parts of the HTV silicone rubber mixture described in Example 2. The resulting mixture was then processed at room temperature on a two-roll rolling mill to give a milled sheet 7 mm thick and sheets were punched out of the milled sheet. After the sheet surfaces had been fixed with a fabric layer, the sheets were vulcanized at atmospheric pressure under hot air at a temperature of 200° C. for 5 minutes. Homogeneously foamed sheets having a thickness of 20 mm, oval pores and a foam density of 0.45 were obtained.

EXAMPLE 8

About 1.5 parts of blowing agent composition (A) and 1 part of tert-butyl perbenzoate (commercially available under the trade name "Trigonox C" from Peroxid-Chemie) were mixed, on a roller, into 100 parts of the HTV silicone rubber mixture described in Example 1. The resulting mixture was then processed at room temperature on a two-roll rolling mill to give a milled sheet 14 mm thick. A sheet section (15 cm × 15 cm × 1.4 cm) was placed in a square spring mold (15 cm × 15 cm × 3 cm). The spring mold was then placed in a hot press and the rubber was vulcanized under pressure for 5 minutes at a temperature of 140° C. A homogeneously foamed square having dimensions of 15 cm × 15 cm × 3 cm, oval pores and a foam density of 0.55 was obtained.

EXAMPLE 9

About 1.5 parts of blowing agent composition (A) and 1.7 parts of the "Vernetzer B" described in Example 1 were mixed, on a roller, into 100 parts of the HTV silicone rubber mixture described in Example 1. The resulting mixture was then processed at room temperature on a two-roll rolling mill to give a milled sheet 16 mm thick. A sheet section (15 cm × 15 cm × 1.6 cm) was placed in a square spring mold (15 cm × 15 cm × 3 cm). The spring mold was then placed in a hot press and the rubber was vulcanized under pressure for 5 minutes at a temperature of 140° C. A homogeneously foamed square having dimensions of 15 cm × 15 cm × 3 cm, oval pores and a foam density of 0.65 was obtained.

EXAMPLE 10

About 10 parts of an iron(III) oxide (commercially available under the trade name "Bayferrox 130B rot" from Bayer AG), 1.5 parts of blowing agent composition (A), 0.5 part of the "Vernetzer E" described in Example 1 and 1.7 parts of the "Vernetzer B" described in Example 1 were mixed, on a roller, into 100 parts of an HTV silicone rubber mixture which contained 72 parts of a dimethylpolysiloxane end-blocked by dimethylvinylsiloxy groups, composed of dimethylsiloxane units and methylvinylsiloxane units, having a viscosity of $2 \times 10^7$ mPa.s at 25° C. and containing 0.05% by weight of Si-bonded vinyl groups and 2 parts of a dimethylpolysiloxane end-blocked by hydroxyl groups and having a viscosity of 35 mPa.s at 25° C. and 26 parts of a hydrophilic, pyrogenically produced silica having a BET surface area of 150 m²/g. The resulting mixture was then extruded to give foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord having a diameter of 14 mm and having circular pores, a homogeneous pore size distribution and a foam density of 0.6 was obtained.

EXAMPLE 11

About 10 parts of a silanized ground quartz (commercially available under the trade name "Silbond 600 TST" from Quarzwerke Frechen), 1.5 parts of blowing agent composition (A), 0.5 part of the "Vernetzer E" described in Example 1 and 1.7 parts of the "Vernetzer B" described in Example 1 were mixed, on a roller, into 100 parts of the HTV silicone rubber mixture described in Example 10. The resulting mixture was then extruded to give foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord having a diameter of 12 mm and having circular pores, a homogeneous pore size distribution and a foam density of 0.5 was obtained.

EXAMPLE 12

About 8 parts of the iron(III) oxide described in Example 10, 1.5 parts of blowing agent composition (A), 0.5 part of the "Vernetzer E" described in Example 1 and 1.7 parts of the "Vernetzer B" described in Example 1 were mixed, on a roller, into 100 parts of an HTV silicone rubber mixture which contained 55 parts of a dimethylpolysiloxane end-blocked by dimethylvinylsiloxy groups, composed of dimethylsiloxane units and methylvinylsiloxane units, having a viscosity of of $2 \times 10^7$ mPa.s at 25° C. and containing 0.15% by weight of Si-bonded vinyl groups and 14 parts of a dimethylpolysiloxane end-blocked by hydroxyl groups, composed of dimethylsiloxane units and methylvinylsiloxane units, having a viscosity of 35 mPa.s at 25° C. and containing 0.8% by weight of Si-bonded vinyl groups and 31 parts of a hydrophilic, pyrogenically produced silica having a BET surface area of 150 m²/g. The resulting mixture was then extruded to form foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord having a diameter of 10 mm and having circular cores, a homogeneous pore size distribution and a foam density of 0.85 was obtained.

EXAMPLE 13

About 10 parts of an aluminum oxide (commercially available under the trade name "Alcoa T60" from Alcoa), 1.5 parts of blowing agent composition (A), 0.5 part of the "Vernetzer E" described in Example 1 and 1.7 parts of the "Vernetzer B" described in Example 1 were mixed, on a roller, into 100 parts of the HTV silicone rubber mixture described in Example 10. The resulting mixture was then extruded to form foam profiles or foam tubes and vulcanized in a hot air duct. Using an extruder die size of 8 mm in diameter (round cord), a vulcanization time of 5 minutes at 200° C. and an output rate of about 1.5 m/min, a homogeneously foamed round cord having a diameter of 16 mm and having circular pores, a homogeneous pore size distribution and a foam density of 0.55 was obtained.

EXAMPLE 14

About 8 parts of a titanium oxide (commercially available under the trade name "Titanoxid P25" from Degussa), 1.5 parts of blowing agent composition (A), 0.5 part of the "Vernetzer E" described in Example 1 and 1.7 parts of the "Vernetzer B" described in Example 1 were mixed, on a roller, into 100 parts of the HTV silicone rubber mixture described in Example 10. The resulting mixture was then extruded to form foam profiles or foam tubes and vulcanized in four UHF ducts each 1.5 m long, through which hot air at a temperature of 130° C. additionally flowed. Using an extruder die size of 8 mm in diameter (round cord), a vulcanization time of 6 minutes at a microwave energy of 4×3 kW and a frequency of 2700 MHz and an output rate of about 1.0 m/min, a homogeneously foamed round cord having a diameter of 11 mm and having circular pores, a homogeneous pore size distribution and a foam density of 0.75 was obtained.

What is claimed is:

1. A blowing agent composition (a) which may be used to form elastomeric silicone foams consisting essentially of an aqueous emulsion containing organopolysiloxanes (1), emulsifiers (2), water (3) and thickener (4).

2. The blowing agent composition (a) of claim 1, in which the thickener (4) is silicon dioxide having a BET surface area of at least 50 m²/g, which optionally has been rendered hydrophobic.

3. The blowing agent composition (a) of claim 1, which contains from 10 to 50% by weight of organopolysiloxanes (1), from 1 to 7% by weight of emulsifiers (2), from 20 to 80% by weight of water (3) and from 5 to 40% by weight of thickener (4).

4. A process for preparing the blowing agent composition (a) of claim 1, in which an aqueous emulsion consisting essentially of organopolysiloxanes (1), emulsifiers (2) and water (3) is mixed with thickener (4).

* * * * *

UNITED STATES PATENT AND TRADEMARK OFFICE
CERTIFICATE OF CORRECTION

PATENT NO. : 5,332,762
DATED : July 26, 1994
INVENTOR(S) : Adolf Maschberger and Christian Freyer It is certified that error appears in the above-indentified patent and that said Letters Patent is hereby corrected as shown below:

Cover page, item [30] Foreign Application Priority Data delete "Sep. 20, 1992" and insert in lieu of --- Oct. 20, 1992 ---.

Signed and Sealed this

Eighth Day of November, 1994

Attest:

BRUCE LEHMAN

Attesting Officer

Commissioner of Patents and Trademarks